Patented May 8, 1951

2,552,267

UNITED STATES PATENT OFFICE 2,552,267

LIQUID PHASE OXIDATION

William S. Emerson and Robert A. Heimsch, Dayton, Ohio, assignors to Monsanto Chemical Company, St. Louis, Mo., a corporation of Delaware No Drawing. Application March 22, 1949,
Serial No. 82,922

10 Claims. (Cl. 260—524)

This invention relates to liquid phase oxidation of alkyl substituted aromatic compounds in the presence of metallic catalysts. More specifically the invention relates to a method of promoting the catalytic oxidation by conducting it in the presence of certain complex metallo-organic compounds.

The liquid phase oxidation of alkylbenzenes, for example xylene, in the presence of metal oxide or metal salt catalysts is well known to the art. These oxidations have been quite useful in the preparation of partially oxidized products, for example toluic acid, but only very small proportions of the dibasic acids have heretofore been prepared.

The primary purpose of this invention is to provide an improved method whereby substantial yields of acids may be prepared by the oxidation of alkylbenzenes. A further purpose of this invention is to provide new and more practicable methods for the preparation of both monobasic and dibasic acids by the oxidation of dialkylbenzenes with gaseous oxygen. A still further purpose is to increase the yield of terephthalic acid in the oxidation of p-xylene.

Liquid phase oxidations of alkylbenzenes are conventionally conducted in closed retorts under pressure, if necessary, to retain the hydrocarbon at the temperature of reaction. Pressures from 50 to 1000 pounds per square inch are useful, and temperatures of 100 to 250° C. have been used. It is also known that a wide variety of metal oxides and salts are very effective in accelerating the oxidation, for example cobalt oxide, vanadium oxide, lead oxide, barium oxide, iron oxide, manganese oxide, chromium oxide, copper oxide, nickel oxide or the corresponding hydroxides or salts of the same metals or mixtures of them. Under conditions of oxidation the salts and some of the oxides are probably converted to salts of the carboxylic acids present in the reaction mass and the catalytic effect is achieved by the metal in this form. The oxidations are usually conducted by means of oxygen, air, oxygen enriched air, or any other mixture of oxygen and inert gas, in corrosion resistant reactors, for example nickel, stainless steel or glass-lined steel. When oxygen is used in high concentrations there is some explosion hazard; and therefore preferred use involves mixtures of oxygen and inert gases wherein the oxygen is less than fifty percent by volume.

The oxidation of alkylbenzenes can be practiced with any compound having a benzene nucleus and at least one alkyl substituent, for example toluene, o-xylene, m-xylene, p-xylene, mixed xylenes, ethylbenzene, the various isomeric diethylbenzenes, and the hydrocarbons having one or more other alkyl substituents, such as n-propyl, isopropyl and the different butyl radicals, as for example in cumene and cymene. Of particular importance are the dialkylbenzenes wherein the alkyl radicals may be the same or different and each radical has from one to four carbon atoms.

It has been found that the oxidation reaction is promoted by the presence of salts of enolized diketones, for example acetylacetone and acetylacetophenone. In general effective enol salts are those corresponding to the following structural formula:

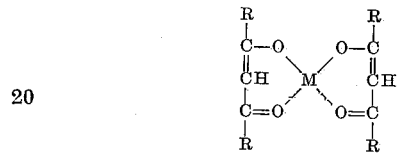

wherein each of the R groups may be the same or different radicals of the group consisting of phenyl, cyclohexyl or alkyl radicals having up to four carbon atoms, and M is a divalent metal capable of existing in other valence states. Suitable metals include cobalt, lead, iron, nickel, copper and manganese. It has been found that substantial increases in the yield of both mono- and dibasic acids are obtained when the oxidation is conducted in the presence of small proportions of salts of the type described. The salts may be added as the metal salt or may be added in the form of the corresponding diketone, in which case the salt corresponding to catalyst is formed. If the metal salt is to be added, the metal corresponding to the catalyst should be used to minimize contamination of the product. In the preferred practice, involving the use of cobalt containing compounds as the principal catalyst, the promoter is added in the form of the cobalt salt, for example cobalt acetylacetonate. In the practice of this invention it has been found that desirable results are obtained by the use of from 0.05 to 2.0 percent by weight of the diketone, based upon the weight of the alkylbenzenes being oxidized, although larger or smaller amounts may be used.

It has been found that the reaction is autocatalytic and that sometimes a period of induction is required before rapid oxidation begins. The induction period is especially noticeable when a new reactor is used, or when an old reactor is used after not being used for a period of time or after use for a different reaction. It is believed that traces of product on the surface of previously used reactors catalyzes the reaction and eliminates or minimizes the usual period of induction. The addition of a small quantity of an oxidation product for example the monocarboxylic acid or the dicarboxylic acid corresponding to the alkylbenzene being oxidized, is beneficial. In the oxidation of p-xylene to terephthalic acid a small quantity of p-toluic acid may be used to reduce the length of the induction period.

Further details of the practice of this invention are set forth with respect to the following specific examples.

*Example 1*

A stainless-steel autoclave was provided with a mechanical agitator consisting of a three blade propeller type and an electric motor suitable for driving the propeller at 1,750 revolutions per minute. A gas inlet tube was so positioned as to be immersed in the reaction mass at a point just above the propeller. The autoclave was vented through a water cooled condenser and then through a valve to regulate the flow of exit gas. The condenser was provided with a means for separating the unreacted xylene and returning it to the autoclave. The temperature was maintained automatically by means of an electric heater and a thermocouple. The flow of gas through the autoclave was maintained by means of an air stream at a constant pressure and regulated by means of the valve in the vent line.

The autoclave was charged with 500 grams of p-xylene, 1.5 grams of cobaltous hydrate and 2.5 grams of p-toluic acid. The temperature was maintained at 160 to 170° C., for four hours, during which time the reactor was maintained at 200 pounds per square inch and air was provided at the rate of 15 cubic feet per hour. The analysis of the product showed a 10.3 percent conversion to terephthalic acid.

*Example 2*

The procedure of Example 1 was duplicated except that the autoclave was also charged with 1.0 gram of the cobalt salt of acetylacetone. The yield of terephthalic acid was thereby increased to 15.4 percent.

*Example 3*

Each of the two preceding examples were duplicated except that m-xylene was used in place of p-xylene. Without the use of the cobalt salt of acetylacetone, a yield of 4.2 percent of isophthalic acid was obtained; with the promoter a yield of 5.8 percent was obtained.

In copending application Serial No. 82,921, filed March 22, 1949, by William S. Emerson and Robert A. Heimsch, there are described and claimed methods of conducting the liquid phase oxidation in two phases of varying conditions of operation. The first stage of the reaction is conducted at lower temperatures and the second stage, after substantial oxidation has taken place, is conducted at higher temperatures. If desired the initial stage may be conducted with a substantially lower oxygen supply which is increased as the reaction approaches completion. Either or both of these expedients may be used in conjunction with the salts of enolized diketones and further improvements in efficiency thereby obtained.

The invention is defined by the following claims.

We claim:

1. The catalytic liquid phase oxidation of dialkylbenzenes to dicarboxylic acids, which comprises contacting a dialkylbenzene having from one to four carbon atoms in the alkyl groups, with an oxygen containing gas in the presence of an oxidation catalyst of the group consisting of metal oxides, metal salts, and mixtures thereof, and a compound having the structural formula:

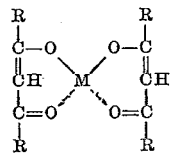

wherein each of the R groups may be the same or different radicals of the group consisting of phenyl, cyclohexyl or alkyl radicals having up to four carbon atoms, and M is a divalent metal capable of existing in compounds in a different valent state.

2. The catalytic liquid phase oxidation of dialkylbenzenes to dicarboxylic acids, which comprises contacting a dialkylbenzene having one to four carbon atoms in the alkyl groups, with an oxygen containing gas in the presence of an oxidation catalyst of the group consisting of metal oxides, metal salts, and mixtures thereof, and a metal salt of acetylacetone.

3. The catalytic liquid phase oxidation of dialkylbenzene to dicarboxylic acid, which comprises contacting a dialkylbenzene having from one to four carbon atoms in the alkyl groups, with an oxygen containing gas in the presence of an oxidation catalyst of the group consisting of metal oxides, metal salts, and mixtures thereof, and a metal salt of acetylacetone, at a temperature between 140° C. and 200° C.

4. The catalytic liquid phase oxidation of a xylene to a dicarboxylic acid, which comprises heating a xylene with an oxygen containing gas in the presence of a cobalt containing catalyst and from 0.05 to 2.0 percent by weight of the cobalt salt of acetylacetone.

5. The catalytic liquid phase oxidation of a xylene to a dicarboxylic acid, which comprises heating a xylene with an oxygen containing gas in the presence of a cobalt containing catalyst and from 0.05 to 2.0 percent by weight of a metal salt of acetylacetone.

6. The catalytic liquid phase oxidation of a xylene to a dicarboxylic acid, which comprises heating a xylene with an oxygen containing gas in the presence of a cobalt containing catalyst and from 0.05 to 2.0 percent by weight of the cobalt salt of acetylacetone, at a temperature in excess of 140° C.

7. The catalytic liquid phase oxidation of a xylene to a dicarboxylic acid, which comprises contacting a xylene with an oxygen containing gas in the presence of a cobalt containing catalyst and from 0.05 to 2.0 percent by weight of the cobalt salt of acetylacetone, at a temperature between 140° C. and 200° C.

8. The catalytic liquid phase oxidation of p-xylene to terephthalic acid, which comprises contacting p-xylene with air at a temperature of 140 to 200° C., in the presence of from 0.05 to 2.0 percent by weight of the cobalt salt of acetylacetone and a cobalt containing catalyst.

9. The catalytic liquid phase oxidation of a xylene to a dicarboxylic acid, which comprises heating a xylene with an oxygen containing gas in the presence of a lead containing catalyst and from 0.05 to 2.0 percent by weight of the lead salt of acetylacetone.

10. The catalytic liquid phase oxidation of p-xylene to terephthalic acid, which comprises contacting p-xylene with air at a temperature of 140 to 200° C., in the presence of from 0.05 to 2.0 percent by weight of the lead salt of acetylacetone and a lead containing catalyst.

WILLIAM S. EMERSON.
ROBERT A. HEIMSCH.

REFERENCES CITED

The following references are of record in the file of this patent:

UNITED STATES PATENTS

| Number | Name | Date |
|---|---|---|
| 2,120,672 | Mares | June 14, 1938 |
| 2,245,528 | Loder | June 10, 1941 |
| 2,276,774 | Henke et al. | Mar. 17, 1942 |
| 2,479,067 | Gresham | Aug. 16, 1949 |